US007694579B2

(12) United States Patent
Tonelli et al.

(10) Patent No.: US 7,694,579 B2
(45) Date of Patent: Apr. 13, 2010

(54) SENSOR INTENDED TO BE EMBEDDED IN A LAYER OF CEMENT MATERIAL OF A PAVEMENT AND SECURITY SYSTEM INCLUDING SAID SENSOR

(76) Inventors: Giorgio Tonelli, Via Bergiola, 30/A, Massa (IT) 54100; Aldo Tonelli, Viale Roma, 140, Massa (IT) 54100

( * ) Notice: Subject to any disclaimer, the term of this patent is extended or adjusted under 35 U.S.C. 154(b) by 464 days.

(21) Appl. No.: 11/646,641

(22) Filed: Dec. 27, 2006

(65) Prior Publication Data

US 2007/0152846 A1 Jul. 5, 2007

(30) Foreign Application Priority Data

Dec. 29, 2005 (EP) ................................. 05425933

(51) Int. Cl.
*G01N 3/00* (2006.01)

(52) U.S. Cl. .......................................... 73/803; 73/760

(58) Field of Classification Search ............ 73/760–860
See application file for complete search history.

(56) References Cited

U.S. PATENT DOCUMENTS 3,732,725 A * 5/1973 Allen et al. .................... 73/81
4,614,110 A * 9/1986 Osterberg ...................... 73/84
5,206,642 A 4/1993 Gregoire et al. ............. 340/933
5,265,481 A 11/1993 Sonderegger et al.
5,461,924 A 10/1995 Calderara et al. ............. 73/786
5,710,512 A * 1/1998 Kondo et al. ................ 324/402

FOREIGN PATENT DOCUMENTS

EP 0491655 A1 11/1991

* cited by examiner

*Primary Examiner*—Max Noori
(74) *Attorney, Agent, or Firm*—Seed IP Law Group PLLC

(57) ABSTRACT

A sensor adapted to be embedded in a layer of cement material of a pavement to detect pressure thrusts acting on said pavement. The sensor includes: a plate-like transducer; a base structure including a container fitted with a chamber such as to house said transducer and a layer of protective material defined between a surface in contact with said transducer and an opposite free surface; a pressure plate including a force transferring portion and a force receiving portion which projects compared to said force transferring portion, the force transferring portion including one end portion facing the force receiving portion and one opposite end portion. The force transferring portion is such as to distance the force receiving portion from the free surface so as to define between the force receiving portion and the free surface a region which can be filled at least in part with the cement material of the layer of cement material.

19 Claims, 4 Drawing Sheets

SENSOR INTENDED TO BE EMBEDDED IN A LAYER OF CEMENT MATERIAL OF A PAVEMENT AND SECURITY SYSTEM INCLUDING SAID SENSOR

BACKGROUND OF THE INVENTION

1. Field of the Invention

The present invention relates, in general, to the technical field of security systems and, in particular, relates to a sensor embedded in a layer of cement material.

2. Description of the Related Art

As is known, there has been a long felt need for protection along the perimeters of locations. Such protection immediately signals, by means of a special alarm emission, any attempt to enter a place to be protected or any attempt to escape from said place.

Well-known and widely used security systems, called underground systems, use various types of sensors intended to be placed in the ground or embedded in the pavement along the perimeter of the place to be protected or along potential accesses to said place. In practice, the underground system sensors are generally sensitive to the footsteps on the ground or on the pavement of a person approaching the perimeter or protected area.

A particular security system of the type described above is known from the teachings of the European patent EP 1005003 B1, which in particular discloses a security system including a plurality of pressure sensors fitted with piezoelectric transducers and intended to be embedded in the pavement. Said sensors are such as to perceive any microstress occurring in the cement layer forming the pavement caused as a result of a person walking on said pavement.

It has been observed that the sensitivity of the security systems known in the art which use pressure sensors intended to be embedded in the pavement, as for example the security system described in the above-mentioned patent EP 1005003 B1, is strongly influenced by the ambient temperature. In particular, it has been observed that the sensitivity of said systems increases as the ambient temperature increases, so that if the security system is calibrated to work at a certain average temperature, the sensitivity of the system will be either too high or too low as the temperature moves away from said average temperature. This situation can create drawbacks and risks because if, for example, the sensitivity of the system is too high, ambient disturbances, such as the passage of a small animal, can generate false alarms. On the contrary, if the sensitivity is too low, there is the risk that dangerous intrusions may go undetected.

BRIEF SUMMARY OF THE INVENTION

For this reason, the applicant has developed security systems equipped with one or more temperature detectors and has also developed for said security systems a control software which can automatically adapt the sensitivity of the security system to the detected ambient temperature. In this way, the reliability of the security systems has been considerably increased. For example, the sensitivity of the system can be adjusted by automatically controlling the gain of the electronic boards which receive and process the signals provided by the sensors.

However, it was observed that particularly low temperatures (for example lower than −20° C.) require an increase in sensitivity such as to render the security systems too sensitive to electromagnetic disturbances or to the background electronic noise of the circuits which receive and process the signals provided by the sensors.

One object of the present invention is to make available a sensor that makes it possible to overcome the disadvantages of the above-described security systems and, in particular, makes it possible to produce security systems whose sensitivity is only minimally conditioned by variations in ambient temperature.

BRIEF DESCRIPTION OF THE SEVERAL VIEWS OF THE DRAWINGS

Further features and advantages of the present invention will become more apparent from the following detailed description of an exemplary but non-limiting embodiment thereof, as illustrated in the accompanying drawings, in which.

Figure 1:
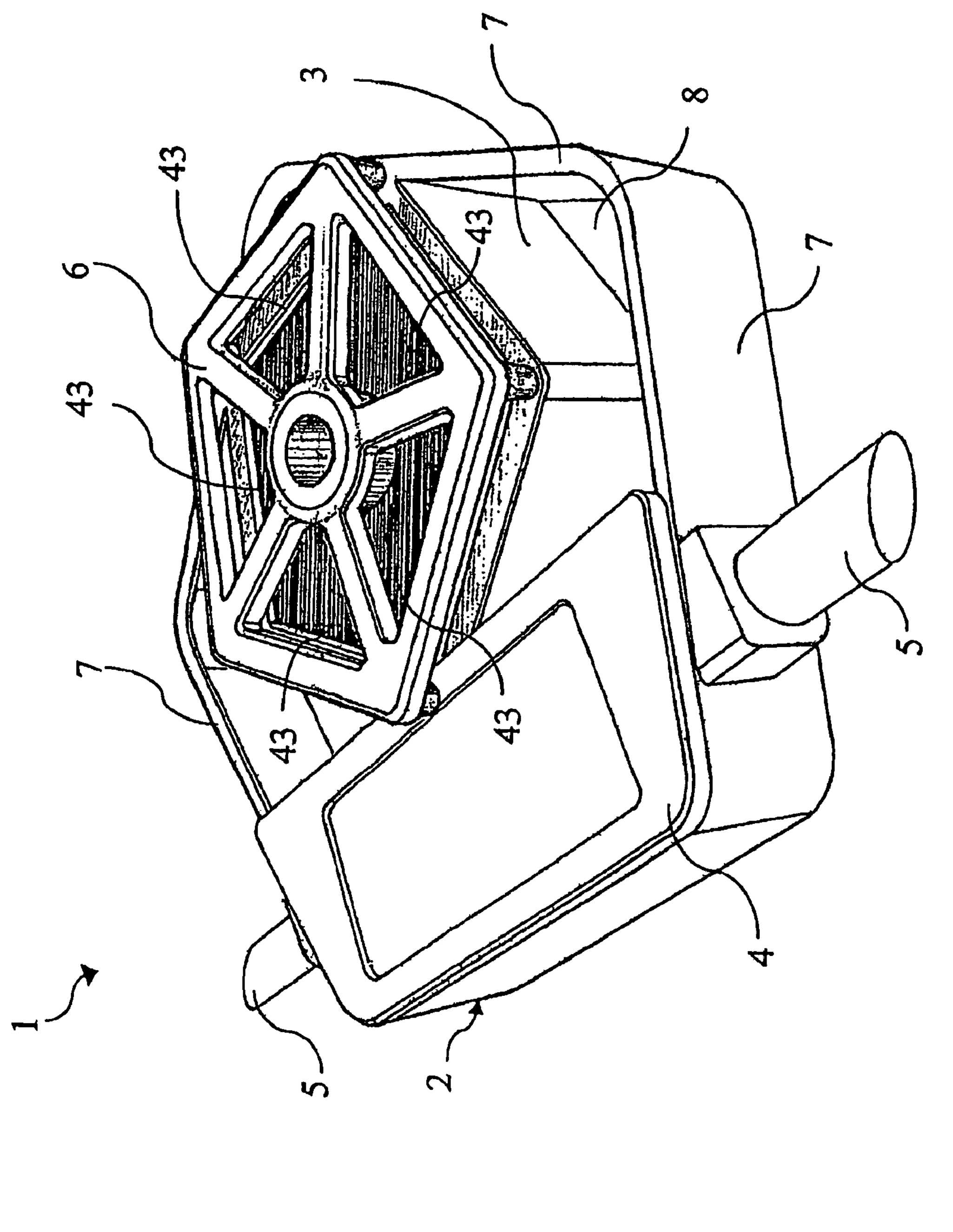
FIG. 1 shows a view from above of a particularly preferred embodiment of a sensor according to the present invention.

In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn, are not intended to convey any information regarding the actual shape of the particular elements, and have been solely selected for ease of recognition in the drawings.

DETAILED DESCRIPTION OF THE INVENTION

FIG. 1 shows a particularly preferred embodiment of a sensor, generally indicated with 1, according to the invention and intended to be embedded in a layer of cement material of a pavement, such as to detect pressure thrusts acting on said pavement. For example, the pressure thrusts are caused by the passage of a person or vehicle on the pavement where the sensor 1 is embedded and that is near the sensor. The sensor 1 can form part of a security system or apparatus which includes several sections each including a plurality of sensors. An apparatus of this type is, for example, disclosed in the above-mentioned European patent EP 1005003 and, for this reason, a systematic description of said apparatus will not be investigated further herein.

The sensor 1 includes a base structure 2, for example made of hard plastic, comprising a first container 3 which houses a transducer, not illustrated in FIG. 1, such as to output electrical signals in reply to mechanical stress to which it is subjected.

A receiving organ or pressure plate 6, also preferably made of hard plastic, is such as to detect, through any microstress in the cement layer where the sensor 1 is to be embedded, any pressure exerted on the pavement and is such as to mechanically stress the transducer housed inside the first container 3 so as transmit to said transducer the pressure thrusts detected.

In a particularly preferred embodiment, a second container 4 is provided in the base structure 2, in order to enable connection of the transducer to electrical input/output cables indicated with 5. If necessary, the second container 4 can contain further electronic components associated to the sensor 1, if provided for. Preferably, the second container 4 is placed beside the container 3 housing the transducer, so as to minimize the overall thickness of the sensor 1.

In a particularly advantageous embodiment, as illustrated in FIG. 1, the base structure 2 includes one or more external walls 7 distanced and spaced from the lateral walls of the first container 3 so as to form one or more cavities 8 which cross the entire base structure 2. The cavities 8 are better illustrated in FIG. 2, where a view from above of the sensor 1 is represented.

With reference again to FIG. 2, preferably one or more connecting fasteners 10, such as protrusions, tabs, tongues, or the like, are provided to connect the lateral walls of the first container 3 to the respective external walls 7. Said tongues 10 are placed substantially parallel to the base of the sensor 1. Advantageously, the tongues 10 make it possible to fix the base structure 2 of the sensor 1 to the surface where it is intended to be placed once installed. Said fixing is preferably obtained by using a thick layer of cement-based adhesive placed between the sensor 1 and the support surface. During installation, the sensor 1 is pressed against the layer of adhesive which, penetrating into the cavities 8, completely incorporates the tongues 10 which, therefore, are immersed in said adhesive.

In practice, since the adhesive, once it has hardened, almost completely envelops the tongues 10, the latter form a particular type of holding means in the base structure 2 which are intended to be immersed in the layer of cement-like adhesive in order to keep the base structure 2 fixed to the support surface, during the cyclic variations in temperature occurring in the pavement as a result of variations in the ambient temperature. It should be noted that the tongues 10 can also be provided in the absence of the above-described external walls 7, since the tongues 10 can carry out their holding function inside the adhesive layer even in the absence of said external walls 7. Obviously, the skilled in the art, on the basis of his knowledge, can easily provide other holding means, alternative and equivalent to the tongues 10, inside the base structure 2.

Figure 3:
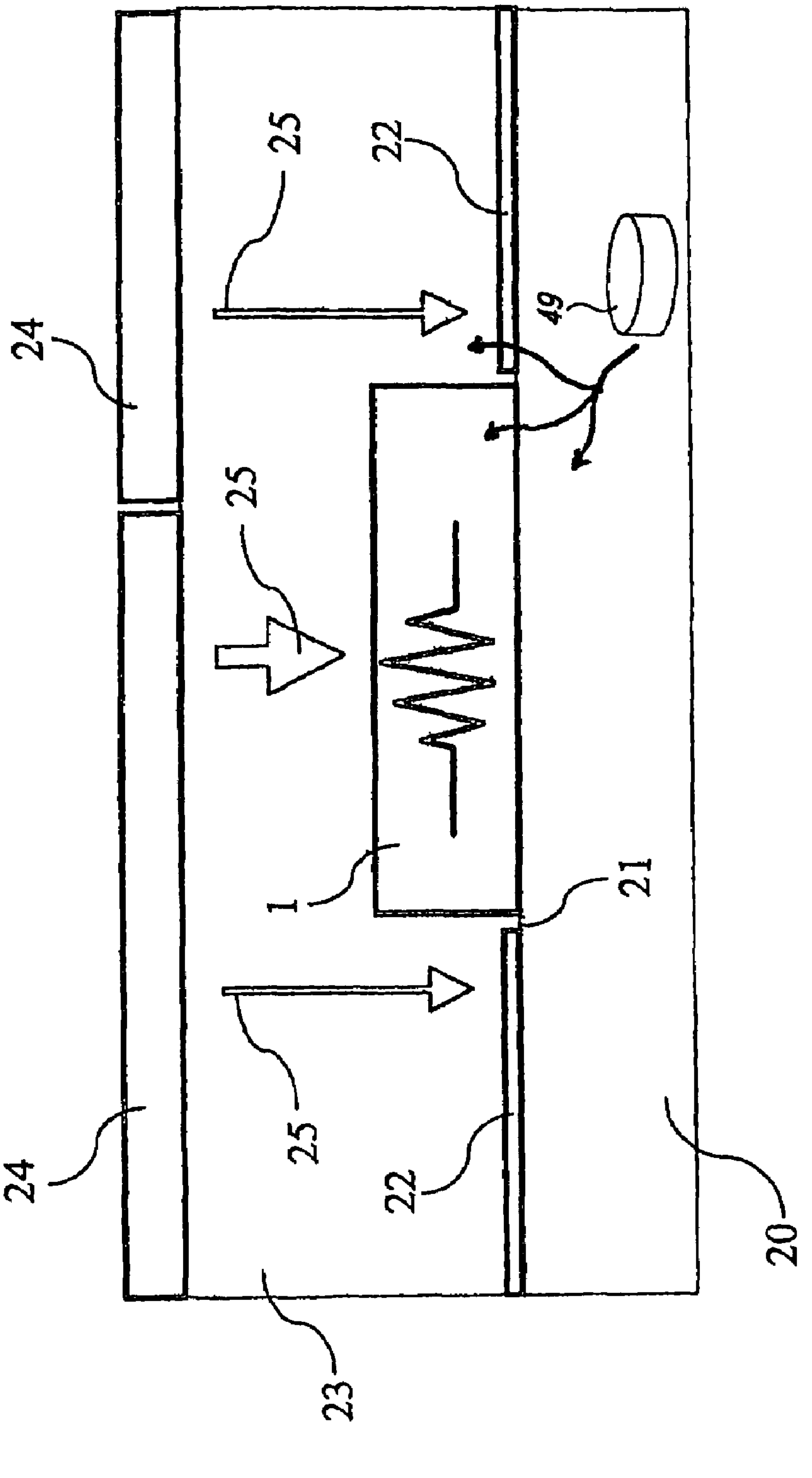
FIG. 3 shows a schematic diagram of a pavement where the sensor in FIG. 1 can be embedded.

FIG. 3 schematically shows a preferred embodiment of a pavement in which the sensor 1 can be installed. In FIG. 3, the sensor 1 is placed on a surface 21 of a first layer 20 in concrete or reinforced cement, usually called a slab. In a particularly advantageous embodiment, on the surface 21 of the first layer 20, a membrane 22 is preferably placed, so as to form a flexible area surrounding the sensor 1 in accordance with the teachings of the above-mentioned European patent EP 1005003. For example, said membrane 22 is a ring-shaped elastomeric membrane closed around the sensor 1. The sensor 1 is fixed to the support surface 21 preferably by means of a cement-based adhesive. A temperature sensor 49 may conveniently located within or outside of, the base structure 2.

The sensor 1 and the membrane 22 are incorporated into a second layer of material 23, for example made of cement or mortar, which in the sector is normally called substrate. A covering layer 24, for example made of tiles, is placed on the second layer of material 23. Even though a particular example of pavement has been described, it should be remembered that a sensor 1 according to the present invention can also be embedded in different types of pavement, for example in a road pavement covered with asphalt.

The arrows 25 in FIG. 3 schematically represent the pressure which is exerted on the layer of material 23 and which reaches the sensor 1 and the elastomeric membrane 22.

Figure 2:
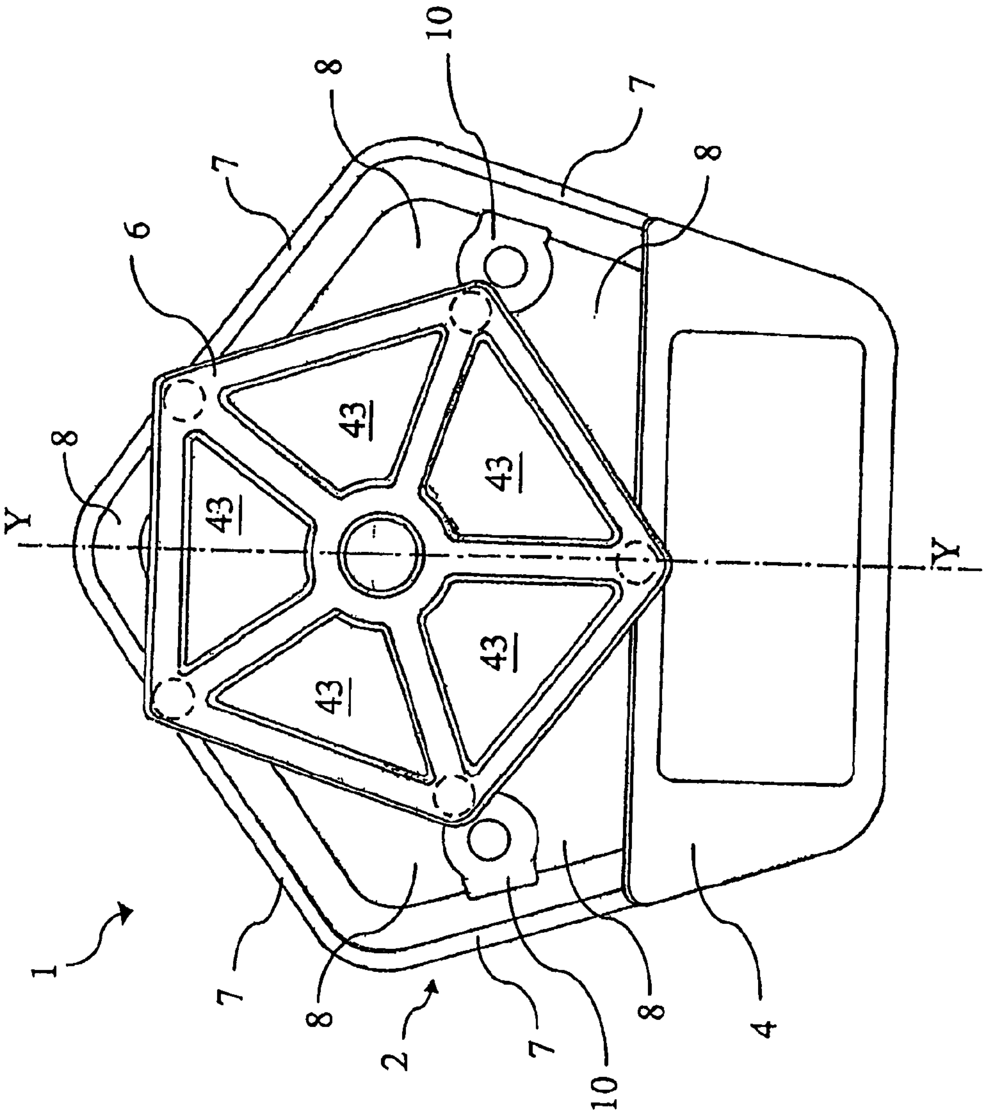
FIG. 2 shows a view from above of the sensor in FIG. 1.
Figure 4:
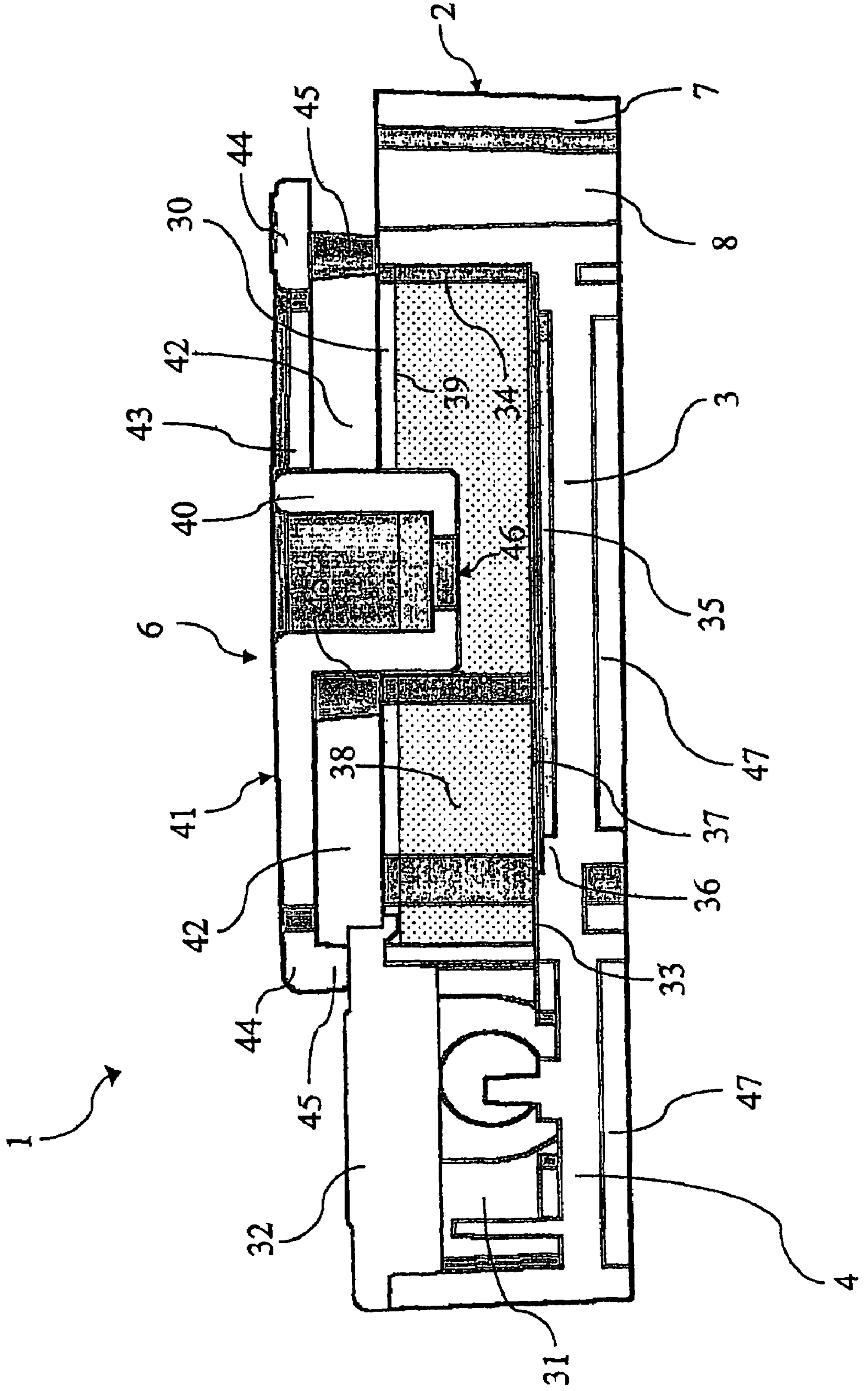
FIG. 4 shows a lateral cross-section along the axis Y-Y of the sensor in FIG. 2.

In FIG. 4, a lateral cross-section along the Y-Y axis of the sensor 1 in FIG. 2 is illustrated. As can be seen in FIG. 4, the first container 3 includes a chamber 30 with one open side. The second container 4 has a chamber 31 with one open side where a lid 32 or suitable covering surface is provided.

The chamber 30 of the first container 3 is defined by a base 33 and a lateral wall 34. The side opposite the base 33 is an open side. In the particular non-limiting embodiment illustrated, the chamber 30 substantially has the shape of a parallelepiped with a pentagonal base. In an alternative embodiment, the chamber 30 can have other shapes, such as for example cylindrical or parallelepiped with a hexagonal base. Under the chamber 30 there is a lower chamber 35. For the sake of clarity, in the following description the chamber 30 will be referred to hereinafter as the upper chamber 30.

Preferably, the lower chamber 35 is defined by a circular base and by a cylindrical shell and is much smaller in depth than the upper chamber 30. For example, in a preferred embodiment, the lower chamber 35 has a depth of approximately 1 mm or 2 mm while the upper chamber 30 has a depth in the range of 1.5 cm-3.5 cm approximately.

In a particularly preferred embodiment, the upper chamber 30 and the lower chamber 35 are connected by a wall with a step-shaped contour, defined by an annular edge which acts as a supporting edge for a plate-like shaped transducer 37 which, therefore, acts as dividing wall between the two chambers 30 and 35.

The transducer 37 is preferably a piezoelectric transducer, in this embodiment disk-shaped, and in practice comprises a plate of conductive material, for example brass or copper, covered with a thin layer of piezoelectric ceramic. In practice, the lower chamber 35 acts as a deflection chamber for the transducer 37. Its limited depth advantageously makes it possible to avoid breakage of the transducer 37 when the latter is subjected to excessive mechanical stress, since in this case the base 36 of the lower chamber 35, abutting against the transducer 37, limits the possibility of inflection of said transducer 37.

Conductor wires, not illustrated in FIG. 4, coupled to the transducer 37 and, in this particular embodiment, extend inside the chamber 31 of the second container 4 to be connected to the input/output electrical cables 5 (shown in FIG. 1). By means of the input/output electrical cables 5, the transducer 37 can output electrical signals from the sensor 1 in reply to mechanical stress such as to cause deformation of the transducer 37.

One side of the transducer 37 is facing the lower chamber 35 and the opposite side is facing the upper chamber 30.

Advantageously, inside the upper chamber 30 there is a layer of protective material 38 defined between a lower surface in contact with the side of the transducer 37 facing the upper chamber 30 and an opposite free side 39, facing the open side of the upper chamber 30. Preferably, the layer of protective material 38 is a layer of resin which fills a considerable part of the upper chamber 30. More preferably, the layer of initially liquid resin 38 almost totally fills the upper chamber 30. The resin used is preferably a bi-component epoxy resin or a bi-component polyurethane resin.

The layer of resin protective material 38 acts as a sealant, preventing the formation of oxide on the side of the transducer 37 facing the upper chamber 30, due to any possible infiltration of humidity from the outside, or condensation inside caused by temperature variations. Advantageously, after solidifying, the layer of resin protective material 38 is such that it can also transmit to the transducer 37 pressure thrusts corresponding to at least downward forces exerted on the receiving organ or pressure plate 6, so that the transducer 37 is subjected to a corresponding mechanical stress. For this reason, the layer of resin protective material 38 is sufficiently rigid to guarantee that said pressure thrusts corresponding to the downward exerted forces are essentially transmitted to the transducer 37 and not absorbed by the layer of resin 38. In a particularly preferred embodiment, the second container 4 is also filled with a protective material, such as a layer of resin.

Advantageously, the receiving organ or pressure plate 6 includes a shaft 40 and a head 41. Shaft 40 is a generally vertical oriented force transferring portion 40, such as a shaft, column, beam, rod, tube, or the like, which may be hollow or solid. Head 41 includes a horizontal oriented force receiving portion 41 which protrudes over at least a portion of the lateral walls of the shaft 40. The shaft 40 includes one upper end portion facing the head 41 and one lower end portion immersed in the layer of protective material 38.

Advantageously, the shaft 40 is such as to distance the head 41 from the free surface 39 of the protective layer 38 so as to define, between the head 41 and the free surface 39, at least one region 42 which can be filled at least in part by the cement material 23 when the sensor 1 is embedded in the layer of cement material. Preferably, said region 42 is an annular region which extends around the shaft 40.

In this way, advantageously, when the cement material solidifies, the receiving organ or pressure plate 6 (and in particular its head 41 or force receiving portion 41) is covered by the layer of cement material 23 in which the sensor 1 is to be embedded. This makes it possible to prevent any loss of contact between the receiving organ or pressure plate 6 and the layer of cement material 23, due to the different thermal expansion constants of the material with which the sensor 1 is made, generally plastic, and the cement material 23. In fact, it has been observed that the variation in sensitivity of the sensors known in the prior art based on variations in the ambient temperature, is essentially due to said loss of contact. In practice, the loss of contact between the receiving organ or pressure plate 6 and the layer of cement material 23 causes a considerable reduction in the sensitivity of the sensor 1.

In one embodiment, as illustrated in FIG. 4, the head 41 or force receiving portion 41 of the receiving organ or pressure plate 6 is essentially flat-shaped and extends substantially parallel to the free surface 39 of the protective layer 38. The shaft 40 or force transferring portion 40 of the pressure plate 6 is arranged substantially in the centre of the head 41 of the pressure plate 6 and acts as a spacing element between the head 41 and the free surface 39 of the layer of protective material 38 or, similarly, between the head 41 and the walls of the first container 2 which define the upper chamber 30. Preferably, the upper portion of the shaft 40 which is not immersed in the layer of protective material 38 is of a height comparable to the height of the lower portion immersed in the layer of protective material 38.

In the particular embodiment illustrated, the external perimeter of the head 41 is substantially pentagon-shaped (as can be better seen in FIGS. 1 and 2). Alternatively, but not limited to, the head 41 could, for example, be substantially disk-shaped or any other suitable shape.

In a particularly advantageous embodiment, one or more through holes 43 communicating with the region 42, extending through the thickness of the head 41, in order to facilitate, during installation of the sensor 1, penetration of the cement material 23 into the region 42 and to create greater continuity between the layer of cement material 23 in which the sensor 1 is embedded and the cement material 23 penetrated into the region 42. More preferably, a plurality of through holes 43 (better seen in FIGS. 1 and 2) extend through the thickness of the head 41. In some embodiments, holes 43 are substantially gore-shaped and arranged radially around the shaft 40. Any suitable shape of hole 43 may be used in alternative embodiments.

In a particularly advantageous embodiment, the head 41 of the receiving organ or pressure plate 6 has a peripheral portion 44, preferably annular, which extends to a distance outside of the upper chamber 30 sensor 1 is provided with supporting means or portions 45 so that the peripheral portion 44 can rest on the base structure 2 of the sensor. Preferably, as can be seen in FIG. 4, the supporting means include feet 45 which project towards the underside of the head 41 and towards the upper portion of the base structure 2. Alternatively, but not limited to, the supporting means 45 include pins, feet, or the like, and which rise towards the top of the base structure 2 towards the head 41 of the receiving organ or pressure plate 6.

Advantageously, said supporting means 45 make the structure of the sensor 1 more resistant and, furthermore, permit redistribution of the pressure waves detected or forces received by the head 41 of the receiving organ 6 towards the central part, i.e., permit transfer of received forces to the shaft 40, of the receiving organ 6.

In a particularly advantageous embodiment, the shaft 40 of the receiving organ or pressure plate 6 is a hollow tubular element. In the particular non-limiting embodiment described, the tubular shaft or force transferring portion 40 has a circular cross-section and an opening 46 at the bottom which is such as to enable penetration of the resin or material of the protective layer 38 inside at least a bottom portion of the tubular shaft 40 during assembly of the sensor 1, i.e., before the initially fluid material of the protective layer 38 reaches a solid state. Preferably, the opening 46 on the bottom has a smaller cross-section than the internal cross-section of the tubular element or force transferring member 40, so that, once the resin or fluid material in the protective layer 38 has hardened, the receiving organ 6 is firmly attached to the layer 38 of protective material. Therefore, having a smaller opening 46 on the bottom represents a particularly preferred embodiment of the attaching means provided on the shaft and immersed in the layer of protective material 38 in order to attach the receiving organ 6 to the layer of protective material 38. In an alternative embodiment, not illustrated in the figures, in the case the shaft 40 or the force transferring member 40 may be, for example, a solid element. The attaching means or solid force transferring member 41 could include a projecting edge, compared to the remaining part of the lateral surface of the shaft 40 immersed in the layer of protective material 38, as an attaching means. For example, in the case the shaft 40 is a cylindrical element, the projecting edge is an annular edge which projects beyond the cylindrical shell of the shaft 40 and which, for example, is placed substantially near the base of the shaft 40 so as to be surrounded and encased by the protective material 38 when in its initial fluid state.

As illustrated in FIG. 4, in a particularly advantageous embodiment, one or more pockets or blind cavities 47 are provided on the bottom of the base structure 2. This particular structure with empty pockets on the bottom of the base structure 2 advantageously makes it possible to place the sensor 1, during installation in the pavement, in such a way that it remains substantially horizontal, despite the fact that its supporting surface, as often happens in practice, is not perfectly flat but is an irregular surface.

As can be deduced from the above, the pressure sensing objective is fully reached, since sensor 1, and especially its receiving organ or pressure plate 6, despite the variations in ambient temperature to which it is subjected, is capable of maintaining continuous contact with the layer of cement material 23 (FIG. 3) in which the sensor 1 is embedded when installed, withstanding any forces which might tend to separate the surface of the sensor 1 from said material 23. Experimental tests have demonstrated that, advantageously, a sensor 1 maintains practically constant sensitivity in the range of temperature from −30° C. and 30° C.

Obviously, on the basis of the teachings of this description, a security system can be designed wherein, together with one or more of the sensors 1, control software is also provided such as to adapt the sensitivity of sensor 1 on the basis of an ambient temperature value detected by at least one temperature sensor 49 provided in the system, especially for fine and automatic sensitivity adjustment.

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

From the foregoing it will be appreciated that, although specific embodiments of the invention have been described herein for purposes of illustration, various modifications may be made without deviating from the spirit and scope of the invention. Accordingly, the invention is not limited except as by the appended claims.

The invention claimed is:

1. A sensor adapted to be embedded in and buried under a layer of cement material of a pavement to detect pressure thrusts acting on said pavement, the sensor comprising:

a plate-like transducer operable to convert mechanical stress into electrical signals;

a base structure including a container fitted with a chamber such as to house said transducer and a layer of protective material defined between a surface in contact with said transducer and an opposite free surface; and a pressure plate including a force receiving portion and a force transferring portion which projects compared to said force receiving portion, the force transferring portion including one end portion facing the force receiving portion and one opposite end portion immersed in said layer of protective material to transmit pressure thrusts received from said force receiving portion to said transducer, wherein the force receiving portion is spaced a distance from said free surface so as to define between said force receiving portion and said free surface a region which can be filled at least in part with the cement material of said layer when said sensor is embedded in and buried under said layer of cement material, said force receiving portion having at least one through opening communicating with said region.

2. The sensor according to claim 1 wherein an annular region extends around the force transferring portion in said region.

3. The sensor according to claim 1 wherein said force receiving portion is substantially flat in shape and which extends substantially parallel to said free surface, said force transferring portion being connected substantially to the center of said force receiving portion.

4. The sensor according to claim 1 wherein said force transferring portion is of such a length that one portion of force transferring portion not immersed in said layer of protective material is of a height comparable to the height of said end portion immersed in said layer of protective material.

5. The sensor according to claim 1 wherein said at least one through opening includes a plurality of openings substantially gore-shaped and arranged radially around said force transferring portion.

6. The sensor according to claim 1 wherein said force receiving portion has a peripheral portion which protrudes outside said chamber, said sensor further comprising supporting means so that said peripheral portion can rest on the base structure.

7. The sensor according to claim 1 wherein said force transferring portion further comprises attaching means immersed in said layer of protective material to attach said pressure plate to said layer of protective material.

8. The sensor according to claim 7 wherein said force transferring portion is a hollow tubular element and wherein said attaching means include an opening facing said immersed end portion of the force transferring portion, said opening having a smaller cross-section than the internal cross-section of said tubular element.

9. The sensor according to claim 1 wherein said base structure is intended to be fixed to a support surface by means of a cement adhesive and wherein said base structure includes holding means intended to be immersed in said cement adhesive in order to block said base structure to said support surface.

10. The sensor according to claim 1 wherein the base structure includes one or more external walls distanced and spaced by the lateral walls of said container so as to form one or more cavities which cross the entire area of said base structure.

11. The sensor according to claim 9 wherein said holding means include fasteners such as to connect said lateral walls of said container to respective external walls.

12. A security system including at least one sensor according to claim 1.

13. The security system according to claim 12, further comprising at least one temperature sensor and electronic control means to adjust the sensitivity of said security system on the basis of an ambient temperature value detected by said temperature sensor.

14. A sensor adapted to be embedded in a layer of support material, comprising:

a base structure having a plurality of exterior walls and a bottom;

a transducer operable to convert a mechanical stress generated by a force exerted on the sensor into an electrical signal;

a container in the base structure and having a chamber with the transducer positioned therein and a layer of a protective material positioned therein, the protective material defined by a lower surface adjacent to the transducer and an upper free surface;

a pressure plate having a force receiving portion that receives the force and a force transferring portion engaged with at least a portion of the protective material to transfer the force to the transducer; and a fill region disposed between the upper free surface of the protective material and the force receiving portion such that when the sensor is embedded in the support material a portion of the support material resides in the fill region.

15. The sensor according to claim 14 wherein the force receiving portion is substantially flat in shape and extends substantially parallel to the free surface, and wherein the force transferring portion is connected to a center of the force receiving portion.

16. The sensor according to claim 14 wherein the force transferring portion comprises:

a first portion immersed in the layer of protective material; and a second portion above the layer of protective material having a height that is approximately equal to a height of the first portion.

17. The sensor according to claim 14, further comprising:

a peripheral portion on the force receiving portion which protrudes outside the chamber; and a means for supporting so that the peripheral portion rests on the base structure.

18. The sensor according to claim 14 wherein the force transferring portion comprises:

a means for attaching to the layer of protective material by immersion to attach the pressure plate to the layer of protective material.

19. The sensor according to claim 18 wherein the force transferring portion is a hollow tubular element and wherein the means for attaching is an opening at an end of the force transferring portion and is immersed in the protective material, the opening having a smaller cross-section than an internal cross-section of the tubular element.

* * * * *